UNITED STATES PATENT OFFICE.

GUSTAV AUGUSTUS HENRY MULLER, OF MONTREAL, QUEBEC, CANADA.

COMPOUND FOR EXTERMINATING VERMIN.

1,015,701.  Specification of Letters Patent.  Patented Jan. 23, 1912.

No Drawing.  Application filed April 7, 1911.  Serial No. 619,461.

*To all whom it may concern:*

Be it known that I, GUSTAV AUGUSTUS HENRY MULLER, a subject of the King of Great Britain, and resident of 138 Milton street, in the city of Montreal, Province of Quebec, in the Dominion of Canada, have invented certain new and useful Improvements in Compounds for Exterminating Vermin; and I do hereby declare that the following is a full, clear, and exact description of the same.

The invention relates to a compound for exterminating vermin, and the object of the invention is to devise a means of attracting the insects and other vermin at night-time to an entangling surface, said surface being equally efficacious during the day-time, and generally to provide a simple and convenient means for making sticky fly paper and the like, and it consists essentially of the novel combination of ingredients to form a compound, both luminous at night and viscous day and night.

One of the parts of the compound is a viscous ingredient, preferably made up of resin or any resinous substance and castor oil, though there are several formulas for a fly paper sticky substance and almost any one of these may be used, the main feature being to provide a viscous composition. In some cases petrolatum, vaseline or glycerin may be added to the resin in place of castor oil, anyway it is most likely to be resin and an oil product for in those two ingredients, the proper consistency for a good entangling effect can be most easily reached. The other ingredient of the compound is any luminous substance compounded or simple, that is to say, a substance which gives forth light at night-time, or in the dark. The particular ingredients of this luminous substance are not essential to the invention, though it has been proved that the most adaptable substance to mix with the viscous substance is that made up of luminous sulfid of calcium (mono-sulfid CaS, which is usually produced by heating powdered oyster shells and sulfur together in a closed crucible,) the powder may be mixed with another ingredient, such as sulfid of barium, before being added to the viscous substance or be in the form of luminous paint. Any small departure in regard to the mixing of these ingredients is not materially concerned in the proper working out of this invention, so long as the effective luminous substance is mixed with the viscous composition.

A very good addition to the luminous substance is a zinc salt or compound for a coloring matter, as this produces a blue light extremely effective in the attraction of insects.

It is possible, of course, to use phosphorus, but on account of its poisonous properties, it is advisable to avoid it, besides the best compound is made with the luminous sulfid of calcium, sulfid of barium and perhaps a gum varnish together with the resin and oil product.

In the uses of this invention, the substance is preferably contained in tins, thoroughly sealed and sold in small packages so that the consumer can buy a small package and spread the viscous or sticky substance over any sheet of paper or in fact many forms of suitable backing, further the substance may be spread over the branches and trunks of fruit trees and attract the moths at night-time by the radiation of the light.

There are many uses to which this invention may be put, but naturally the main object is the general use for trapping flies and so avoiding that household nuisance and this is probably the cheapest and cleanest form in which a sticky fly paper can be supplied to the public.

What I claim as my invention is:

1. A compound for exterminating vermin, consisting of a sticky and substantially non-drying mixture of a resinous substance and an oil product, and a luminous substance.

2. A compound for exterminating vermin, consisting of resin and castor oil, and a luminous substance, mixed together.

3. A compound for exterminating vermin, consisting of a sticky and substantially non-drying viscous substance and luminous sulfid of calcium and sulfid of barium, mixed together.

4. A compound for exterminating vermin, consisting of a sticky and substantially non-drying viscous composition and luminous sulfid of calcium, sulfid of barium and a gum varnish, mixed together.

5. A compound for exterminating vermin, consisting of a sticky and substantially non-drying viscous composition, and a luminous substance, mixed together.

6. A compound for exterminating vermin, consisting of a luminous substance, resin, and a substance adapted to retain said resin in a sticky and substantially non-drying viscous state all mixed together.

Signed at the city of Montreal, Province of Quebec, Canada, this fourth day of April, 1911.

GUSTAV AUGUSTUS HENRY MULLER.

Witnesses:
F. A. BINNS,
P. SHEE.